(12) United States Patent
Wang

(10) Patent No.: US 12,372,475 B2
(45) Date of Patent: Jul. 29, 2025

(54) OPTICAL SENSING SYSTEM AND OPTICAL SENSING METHOD

(71) Applicant: PIXART IMAGING INC., Hsin-Chu (TW)

(72) Inventor: Guo-Zhen Wang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 161 days.

(21) Appl. No.: 18/377,843

(22) Filed: Oct. 9, 2023

(65) Prior Publication Data

US 2025/0116608 A1 Apr. 10, 2025

(51) Int. Cl.
*G01N 21/88* (2006.01)

(52) U.S. Cl.
CPC ..... *G01N 21/8806* (2013.01); *G01N 21/8851* (2013.01); *G01N 2021/8825* (2013.01)

(58) Field of Classification Search
CPC ........... G01N 21/8806; G01N 21/8851; G01N 2021/8825
See application file for complete search history.

(56) References Cited

U.S. PATENT DOCUMENTS 6,327,374 B1* 12/2001 Piironen ................ G01N 21/57
382/108
11,022,553 B2* 6/2021 Richard ............. G01N 21/8901

* cited by examiner

*Primary Examiner* — Seung C Sohn
(74) *Attorney, Agent, or Firm* — Li & Cai Intellectual Property (USA) Office

(57) ABSTRACT

An optical sensing system and an optical sensing method are provided. The system includes a bright-field light source, a dark-field light source, an optical detecting circuit, and a processing circuit. The processing circuit performs a floor type detection process, including: controlling the dark-field light source to provide dark-field illumination; receiving, by the optical detecting circuit, scattered lights of the dark-field light source; executing a dark-field computation process to obtain a first optical characteristic, and determining whether the first optical characteristic meets a first surface condition; in the negative, determining that a floor is a first type; in the affirmative, controlling the bright-field light source to provide bright-field illumination; receiving, by the optical detecting circuit, scattered lights of the bright-field light source; executing a bright-field computation process to obtain a second optical characteristic, and determining whether the second optical characteristic meets a second surface condition.

18 Claims, 13 Drawing Sheets

OPTICAL SENSING SYSTEM AND OPTICAL SENSING METHOD

FIELD OF THE DISCLOSURE

The present disclosure relates to a system and a method, and more particularly to an optical sensing system and an optical sensing method.

BACKGROUND OF THE DISCLOSURE

The existing cleaner robots are capable of adjusting a suction force according to a type of the floor to be cleaned. To determine a floor type, one or more sensors are provided on a cleaning brush of the robot cleaner to obtain a frictional force from feedback signals generated by the sensors. However, the floor type may be falsely detected due to the detected frictional force is easily affected by certain non-surface associated factors, such as brush entanglement.

Moreover, in certain cleaner robots, optical sources with different directivities are utilized in floor type detection, with which the floor type can be determined according to reflected lights received by an optical detector. However, such an approach to determine the floor type is not accurate since the optical detector may be confused when crossing a boundary between different types of floor or confronting small-sized obstacles (e.g., electrical wires).

SUMMARY OF THE DISCLOSURE

In response to the above-referenced technical inadequacies, the present disclosure provides an optical sensing system and an optical sensing method capable of accurately determining a type of the floor to be detected without affecting by small-sized obstacles or floor boundaries.

In order to solve the above-mentioned problems, one of the technical aspects adopted by the present disclosure is to provide an optical sensing system, including a bright-field light source, a dark-field light source, an optical detecting circuit, and a processing circuit. The processing circuit is configured to perform a floor type detection process, which includes: controlling the dark-field light source to provide dark-field illumination on a floor in the target area; receiving, by the optical detecting circuit, scattered lights of the dark-field light source from the floor in the target area; executing a dark-field computation process to obtain a first optical characteristic of the target area according to the scattered lights of the dark-field light source received, and determining whether or not the first optical characteristic meets a first surface condition; in response to determining that the optical characteristic of the floor in the target area does not meet the first surface condition, determining that a floor type of the floor in the target area is a first type; in response to determining that the optical characteristic of the floor in the target area meets the first surface condition, controlling the bright-field light source to provide bright-field illumination on the floor in the target area; receiving, by the optical detecting circuit, scattered lights of the bright-field light source from the floor in the target area; executing a bright-field computation process to obtain a second optical characteristic of the target area according to the scattered lights of the bright-field light source received, and determining whether or not the second optical characteristic meets a second surface condition; and in response to determining that the second optical characteristic meets a second surface condition, determining that the floor type of the floor in the target area is a second type.

In order to solve the above-mentioned problems, another one of the technical aspects adopted by the present disclosure is to provide an optical sensing method, including: configuring a processing circuit to perform a floor type detection process, including: controlling a dark-field light source to provide dark-field illumination on a floor in the target area; receiving, by an optical detecting circuit, scattered lights of the dark-field light source from the floor in the target area; executing a dark-field computation process to obtain a first optical characteristic of the target area according to the scattered lights of the dark-field light source received, and determining whether or not the first optical characteristic meets a first surface condition; in response to determining that the optical characteristic of the floor in the target area does not meet the first surface condition, determining that a floor type of the floor in the target area is a first type; in response to determining that the optical characteristic of the floor in the target area meets the first surface condition, controlling a bright-field light source to provide bright-field illumination on the floor in the target area; receiving, by the optical detecting circuit, scattered lights of the bright-field light source from the floor in the target area; executing a bright-field computation process to obtain a second optical characteristic of the target area according to the scattered lights of the bright-field light source received, and determining whether or not the second optical characteristic meets a second surface condition; and in response to determining that the second optical characteristic meets a second surface condition, determining that the floor type of the floor in the target area is a second type.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
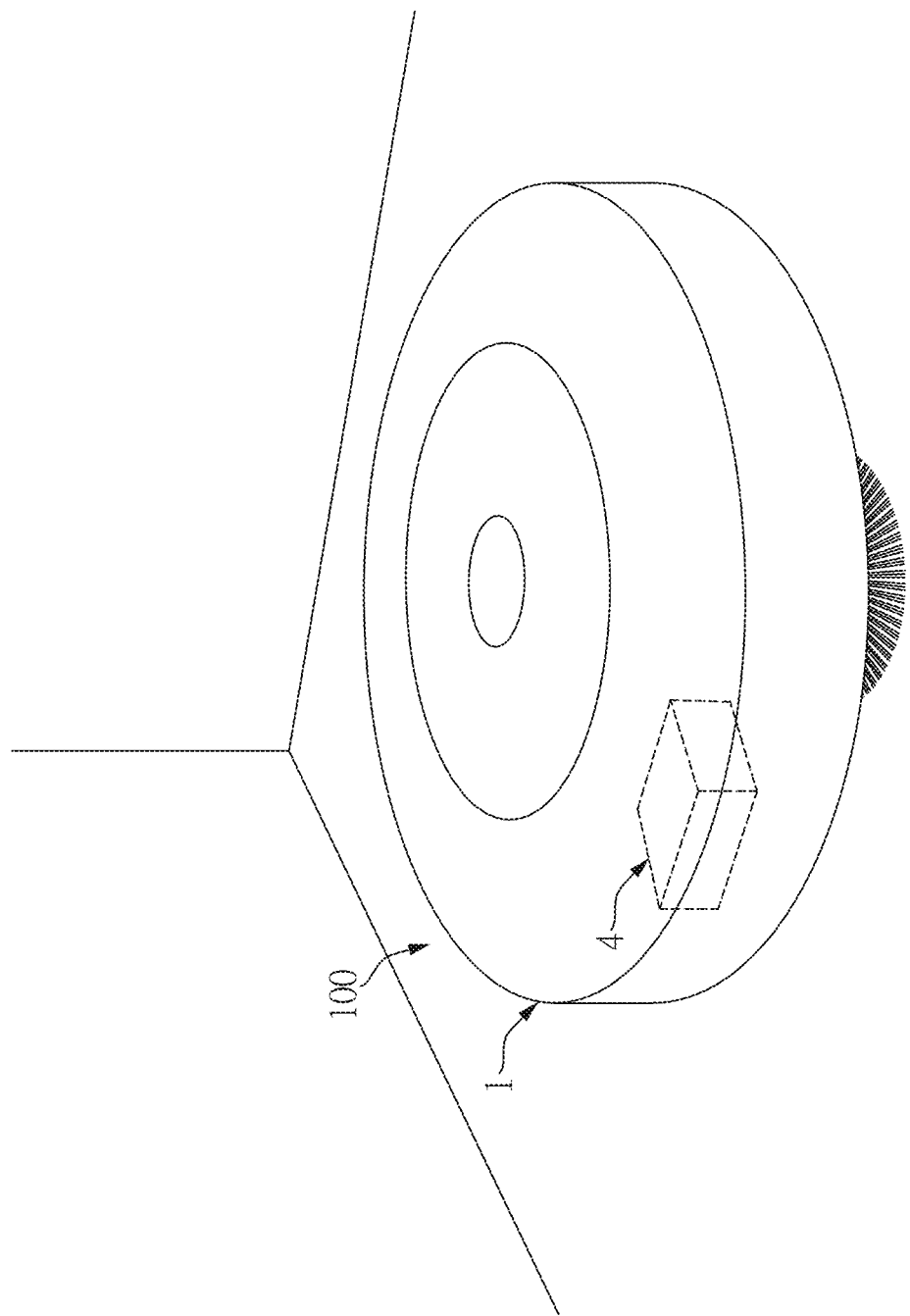
FIG. 1 is a schematic view of an autonomous robot that includes a cleaning system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
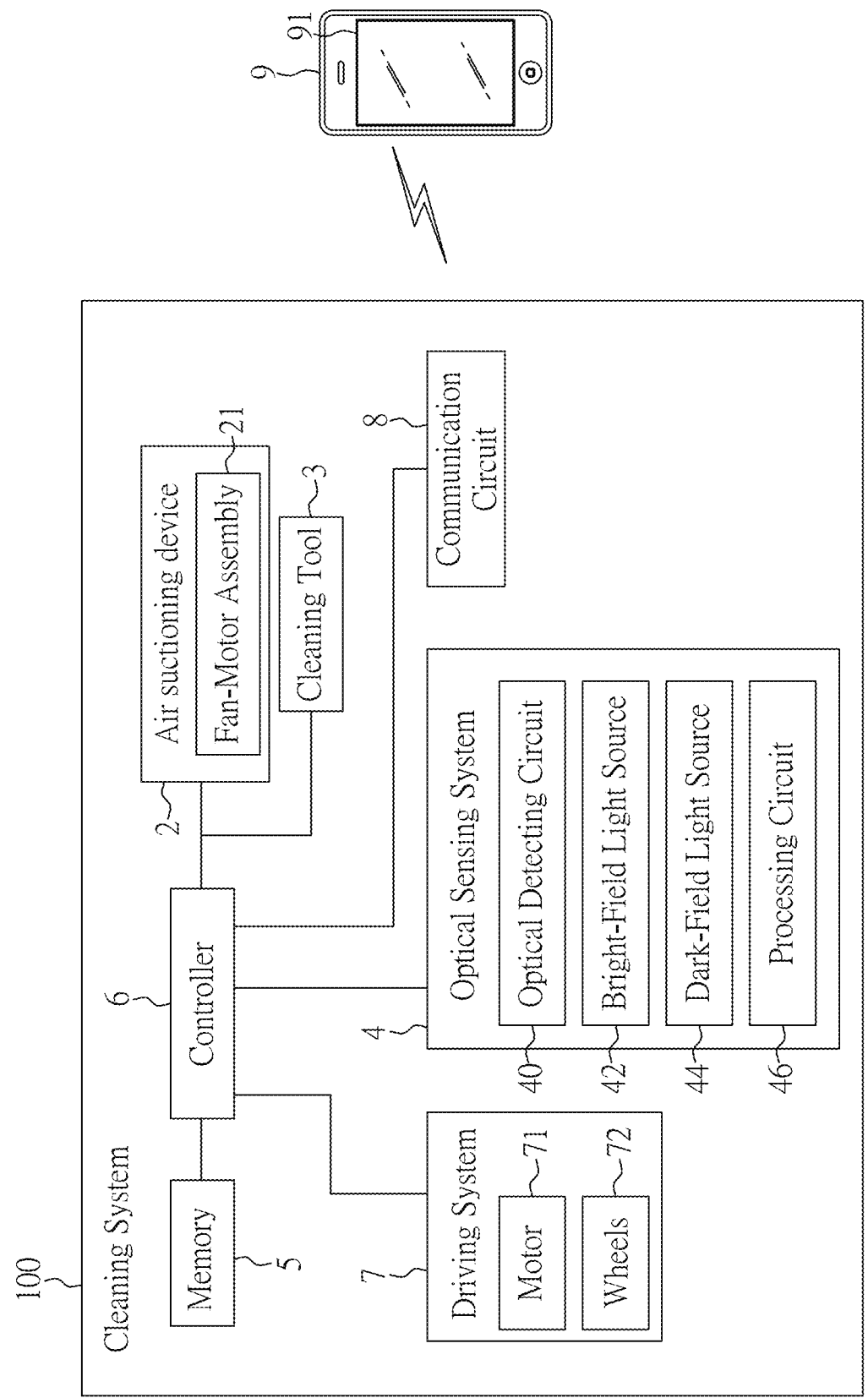
FIG. 2 is a block diagram of the cleaning system according to one embodiment of the present disclosure.
Figure 3:
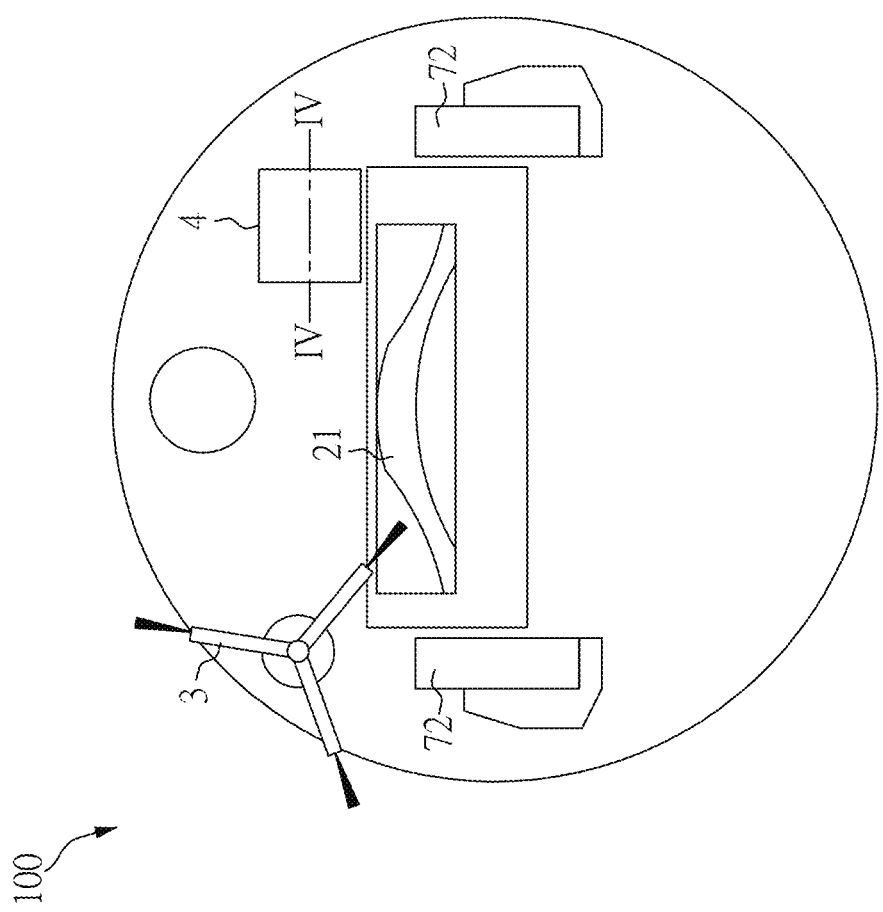
FIG. 3 is a bottom view of the autonomous robot that includes the cleaning system according to one embodiment of the present disclosure.

FIG. 1 is a schematic view of an autonomous robot that includes a cleaning system according to one embodiment of the present disclosure, FIG. 2 is a block diagram of the cleaning system according to one embodiment of the present disclosure, and FIG. 3 is a bottom view of the autonomous robot that includes the cleaning system according to one embodiment of the present disclosure.

Referring to FIGS. 1 to 3, one embodiment of the present disclosure provides a cleaning system 100 that includes a cleaner housing 1, an air suctioning device 2, a cleaning tool 3, an optical sensing system 4, a memory 5 and a controller 6. The cleaning system 100 can be an autonomous robot having a cleaner housing 1 that is cylinder-shaped as shown in FIG. 1.

The air suctioning device 2 can be disposed in the cleaner housing 1 and include a fan-motor assembly 21 that is disposed in an air flow passage provided in the cleaner housing 1. Specifically, the fan-motor assembly 21 can be controlled by the controller 6 to generate a suction force, so as to suction outside air along with dust on the floor close to a suctioning hole 21 formed on a bottom of the cleaner housing 1.

The cleaning tool 3 can include one or more cleaning members that, driven by one or more electric motors controlled by the controller 6, rotatably engage a floor surface to agitate and extract debris.

The optical sensing system 4 can be disposed at the bottom of the cleaner housing 1, and include an optical detecting circuit 40, a bright-field light source 42, a dark-field light source 44, and a processing circuit 46.

Figure 4:
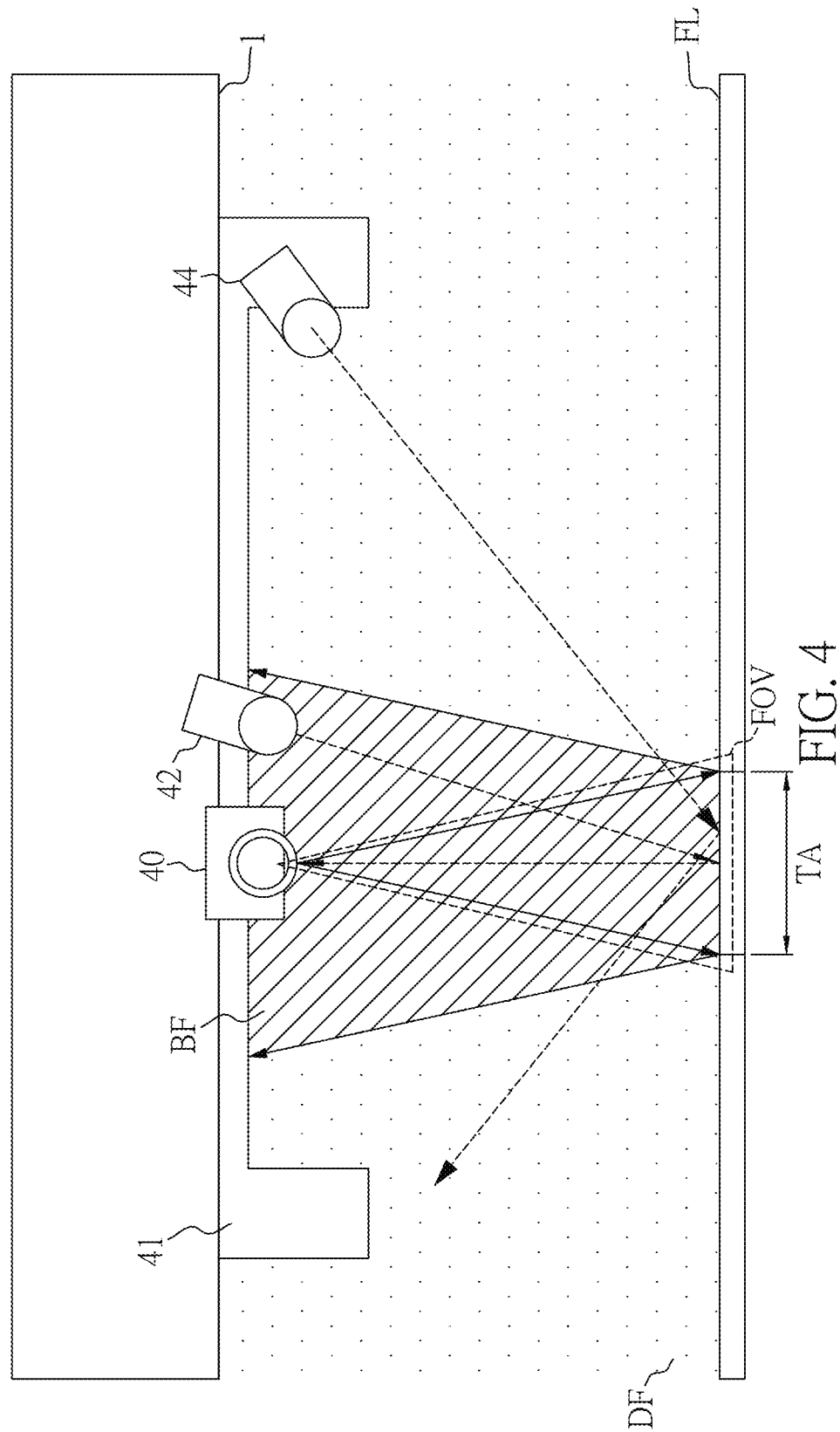
FIG. 4 is a schematic cross-sectional view taken along line IV-IV of FIG. 3.

FIG. 4 is a schematic cross-sectional view taken along line IV-IV of FIG. 3. Referring to FIG. 4, the optical detecting circuit 40 can be disposed at the bottom of the cleaner housing 1, and can be used to receive the lights reflected from a floor FL in a target area TA. The optical detecting circuit 40 can be an optical sensor, for example, an image sensor (e.g., CMOS or CCD sensor chip) that includes a plurality of image sensor units, such as photodiodes. The optical detecting circuit 40 can be further configured to transform light signals into electrical signals.

Specifically, the optical detecting circuit 40 can be disposed on a platform 41 so as to be separated from the floor FL with a predetermined distance. The optical detecting circuit 40 has a field of view (FOV) that is an observable area associated with the predetermined distance. That is, the FOV is the maximum area that the optical detecting circuit 40 can capture.

As shown in FIG. 4, a space beneath the bottom of the cleaner housing 1 is divided into two spaces, which are a bright field BF and a dark field DF. Light sources disposed in the bright field are referred to as bright-field lighting that involves mounting and orienting lights between 90 and 45 degrees from the imaging surface (off horizontal). Conversely, light sources disposed in the dark field DF are referred to as dark-field lighting that involves orienting lights between 0 and 45 degrees off horizontal. However, the present disclosure is not limited thereto. In certain embodiments, light sources with a very low angle with incident light as low as 10-15 degrees from the surface of the floor FL can be used as the dark-field lighting, whereas light sources with incident light from an angle between 90 and 10-15 degrees can be used as the bright-field lighting.

In more detail, the bright field BF can be defined by positions of light sources that with optical paths capable of entering the optical detecting circuit 40 from the FOV, and the dark field DF can be defined by positions of light sources that with optical paths incapable of entering the optical detecting circuit 40.

Therefore, the bright-field light source 42 can include one or more light emitting devices, such as light bulbs or light emitting diodes, and the bright-field light source 42 can be disposed in a bright field BF defined by a field of view (FOV) of the optical detecting circuit 40 and located beneath the cleaner housing 1. In the present embodiment, the bright-field light source 42 can include a linear light source formed by the one or more light emitting devices. It should be noted that the linear light source has a line pattern, in which lights emitted on an object by the linear light source has a plurality of light points forming a line, and such the pattern can be used for floor type detection hereinafter.

Similarly, the dark-field light source 44 can also include one or more light emitting devices, such as light bulbs or light emitting diodes, and the dark-field light source 44 can be disposed in a dark-field BF defined by the FOV of the optical detecting circuit 40 and located beneath the cleaner housing 1.

It should be further noted that, under control of the controller 6, the bright-field light source 42 is arranged to provide bright-field illumination on the floor FL in the target area TA, while the dark-field light source 44 is arranged to provide dark-field illumination on the floor FL in the target area TA.

The processing circuit 46 is electrically connected to the optical detecting circuit 40, the bright-field light source 42, and the dark-field light source 44. The processing circuit 46 can be, for example, a central processing unit (CPU), or other programmable general-purpose or special-purpose microprocessor, digital signal processor (DSP), programmable controllers, application-specific integrated circuits (ASIC), a programmable logic device (PLD), a graphics processing unit (GPU), other similar devices, or a combination of these devices. The processing circuit 46 can be configured to perform a floor type detection process, and details of which will be explained in association with the description hereinafter.

The memory 5 can be configured to store images, program codes, software modules, and other data. It can be, for example, any type of fixed or removable random-access memory (RAM), read-only memory (ROM), flash memory, hard disks or other similar devices, integrated circuits and combinations thereof.

The controller 6 is electrically connected to the air suctioning device 2, the cleaning tool 3, the optical sensing system 4, and the memory 5. The controller 6 can include, for example, a central processing unit (CPU), or other programmable general-purpose or special-purpose microprocessor, digital signal processor (DSP), programmable controllers, application-specific integrated circuits (ASIC), a programmable logic device (PLD), a graphics processing unit (GPU), other similar devices, or a combination of these devices. The controller 6 can execute program codes, software modules, instructions, and the like that are recorded in the memory 5 to implement the cleaning method according to one embodiment of the present disclosure.

In the present embodiment, the cleaning system 100 further includes a driving system 7 disposed in the cleaner housing 1 and electrically connected to the controller 6. The driving system 7 includes a plurality of wheels 72 and a motor 71 configured to drive the plurality of wheels 72 to move or rotate the cleaner housing 1 (the autonomous robot). It should be noted that the controller 6 can be configured to control the components mentioned above.

Moreover, the cleaning system 100 further includes a communication circuit 8 disposed in the cleaner housing 1. The communication circuit 8 can be configured to communicatively connected (e.g., wirelessly connected) to a mobile device 9 of a user. Therefore, information associated with a floor type of the floor FL to be cleaned (i.e., the floor FL located in the target area TA) and magnitude of the suction force that the suction device 2 uses is transmitted between the controller 6 and the mobile device 9 through the communication circuit 8. In certain embodiments, the communication circuit 8 can be a small-range or long-rang wireless communication circuit, which supports certain wireless communication protocols, such as 3G, 4G, 5G networks, BLUETOOTH, WIFI, and the like.

The mobile device 9 can be, for example, a computer, a notebook, or a smart phone. For certain usage scenarios, a cleaner management application can be installed in the mobile device 9 and be executed to provide a user interface for the user to control the cleaning system 100, including functions such as power on/off, setting a cleaning strategy that defines a cleaning frequency and/or a cleaning route in a target region.

Figure 5:
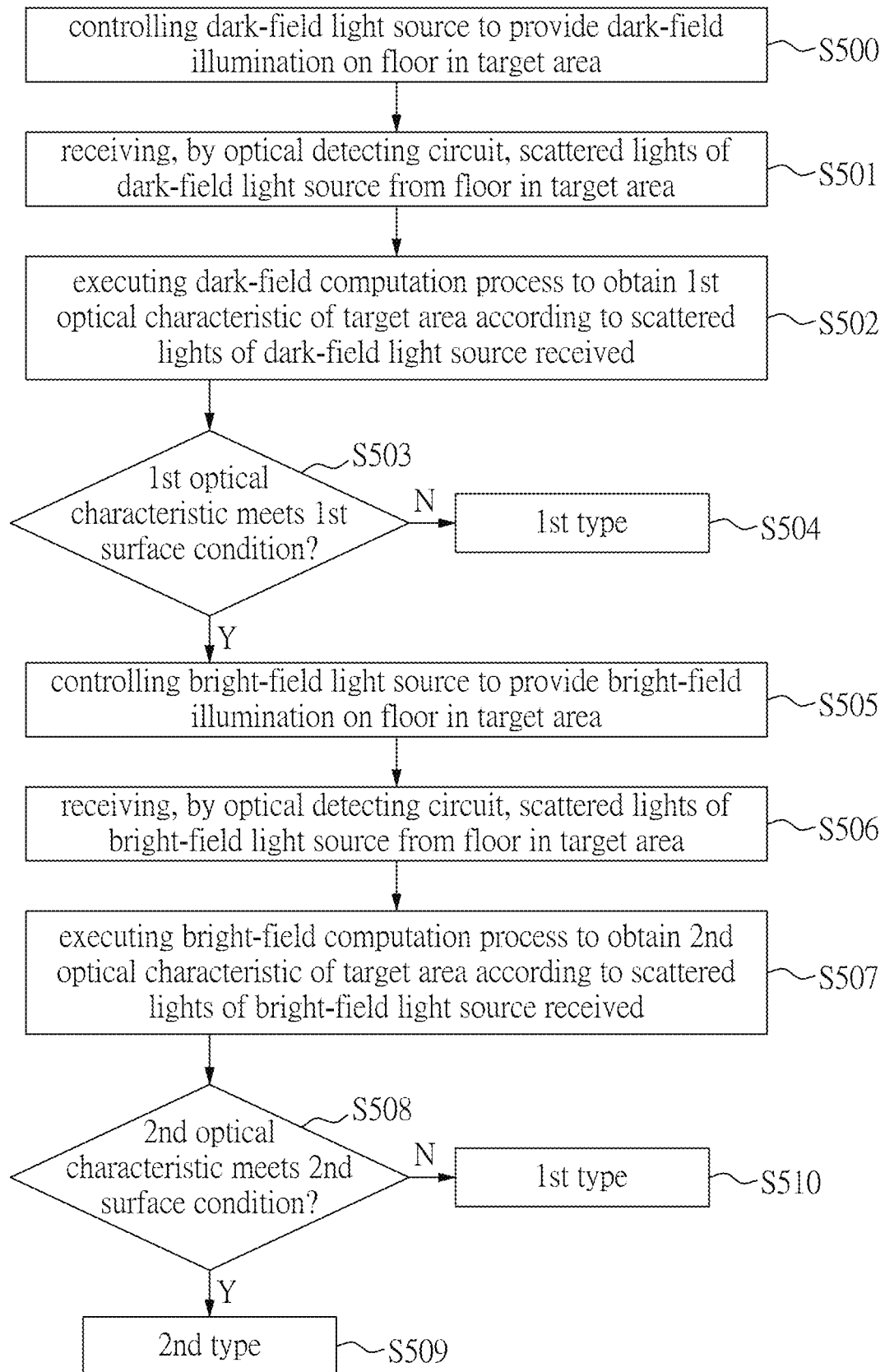
FIG. 5 is a flowchart of the optical sensing method according to one embodiment of the present disclosure.

Reference can be further made to FIG. 5, which is a flowchart of the optical sensing method according to one embodiment of the present disclosure. According to one concept of the present disclosure, the optical sensing system and the optical sensing method in the present embodiment are capable of accurately determining a type of the floor to be detected without affecting by small-sized obstacles or floor boundaries.

As shown in FIG. 5, in the optical sensing method provided by the present disclosure, the processing circuit 46 is configured to perform the floor type detection process that includes the following steps:

Step S500: controlling the dark-field light source to provide dark-field illumination on the floor in the target area.

For example, as the autonomous robot moves, the floor FL to be cleaned enters the FOV of the optical detecting circuit 40, and the dark-field light source 44 is turned on by the processing circuit 46, while the bright-field light source 42 is turned off at the same time.

Step S501: receiving, by the optical detecting circuit, scattered lights of the dark-field light source from the floor in the target area.

Step S502: executing a dark-field computation process to obtain a first optical characteristic of the target area according to the scattered lights of the dark-field light source received.

At step S502, the dark-field computation process can be executed by the processing circuit 46 to obtain light intensities of the scattered lights of the dark-field light source 44 and statistically calculate the light intensities obtained from the target area TA, so as to obtain the first optical characteristic that indicates a surface condition of the floor in the target area TA.

Figure 6A:
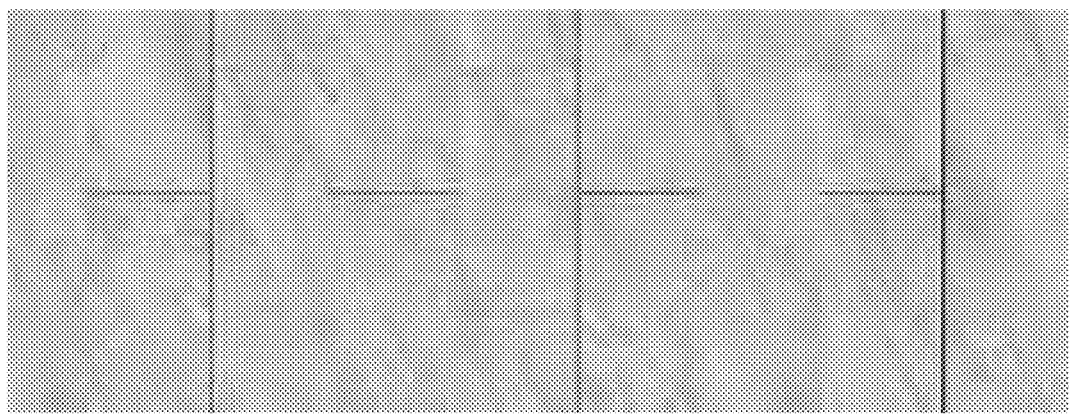
FIGS. 6A and 6B are schematic diagrams showing an image of a floor with ceramic tiles and an image captured therefrom by the optical detecting circuit according to one embodiment of the present disclosure.
Figure 6B:
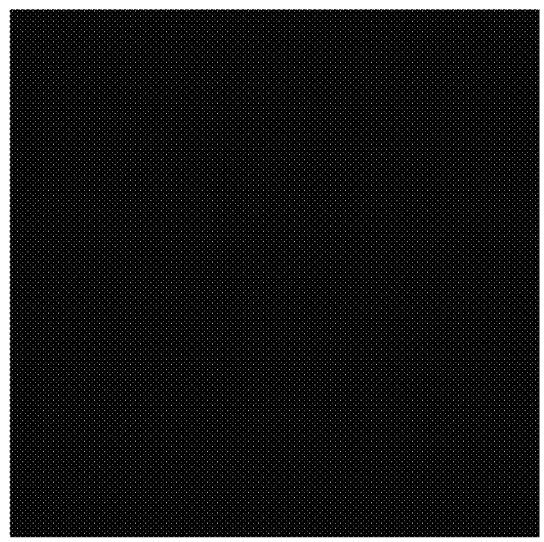

FIGS. 6A and 6B are schematic diagrams showing an image of a floor with ceramic tiles and an image captured therefrom by the optical detecting circuit according to one embodiment of the present disclosure.

In the present embodiment, when the dark-field light source 44 is turned on to provide the dark-field illumination on one type of hard floor, for example, a floor with multiple ceramic tiles shown in FIG. 6A. In this case, scattered lights of the dark-field light source 44 from the ceramic tiles in the target area TA can be captured by the optical detecting circuit 40 and light intensities thereof can be obtained accordingly, as the image shown in FIG. 6B. The obtained light intensities in the image of FIG. 6B can be summed to obtain an overall light intensity, which is then taken as the first optical characteristic and can be used to indicate the surface condition of the floor FL in the target area TA.

The method proceeds to step S503: determining whether or not the first optical characteristic meets a first surface condition.

In step S503, when the overall intensity of the target area TA is taken as the first optical characteristic in this case, whether or not the overall intensity is greater than or equal to a first threshold can be determined in step S503, so as to determine whether or not the first optical characteristic meets the first surface condition. The first surface condition can be, for example, an optical condition that shows the most part of the dark-field illumination is reflected from the floor in the target area without entering the optical detecting circuit 40. Therefore, the first threshold corresponding to the first surface condition can be a predetermined light intensity with a relatively small value.

In response to determining that the optical characteristic of the floor in the target area does not meet the first surface condition in step S503, the method proceeds to step S504: determining that a floor type of the floor in the target area is a first type.

The image of FIG. 6B is taken as an example. Since most of the hard floors (e.g., the ceramic tiles) have surfaces that are relatively smooth and flat, the dark-filed illumination provided on the floor FL may generate very few scattered lights that enter the optical detecting circuit 40. The few reflective lights may result in a dark image shown in FIG. 6B, and the overall light intensity summed therefrom may be lesser than the first threshold.

Figure 7A:
FIGS. 7A and 7B are schematic diagrams showing an image of a floor covered with a carpet and an image captured therefrom by the optical detecting circuit according to one embodiment of the present disclosure.
Figure 7B:
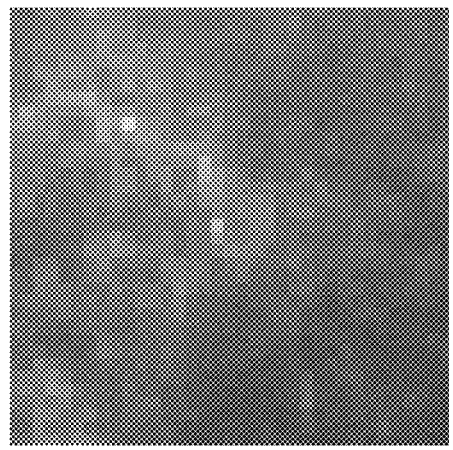

FIGS. 7A and 7B are schematic diagrams showing an image of a floor covered with a carpet and an image captured therefrom by the optical detecting circuit according to one embodiment of the present disclosure.

The floor covered with carpet has a surface that are relatively rough and hairy, the dark-filed illumination provided on the floor FL may generate more reflective lights scattered from the floor with the carpet than those scattered from the floor with the ceramic tiles. After the reflective lights enter the optical detecting circuit 40, a bright image shown in FIG. 7B can be obtained, and the overall light intensity summed therefrom is greater than the first threshold.

Therefore, most types of flat and smooth hard floors can be determined by comparing the first threshold with the overall light intensity that is statistically calculated from the optical characteristic of the floor in the target area TA. Since only the dark-field illumination and mathematical operations with low complexities are utilized by the processing circuit 46, high report rate and low power consumption can be achieved.

However, certain types of hard floor may have a surface with textures, thereby the floor type detection may be confused since only the overall light intensity is considered.

Figure 8A:
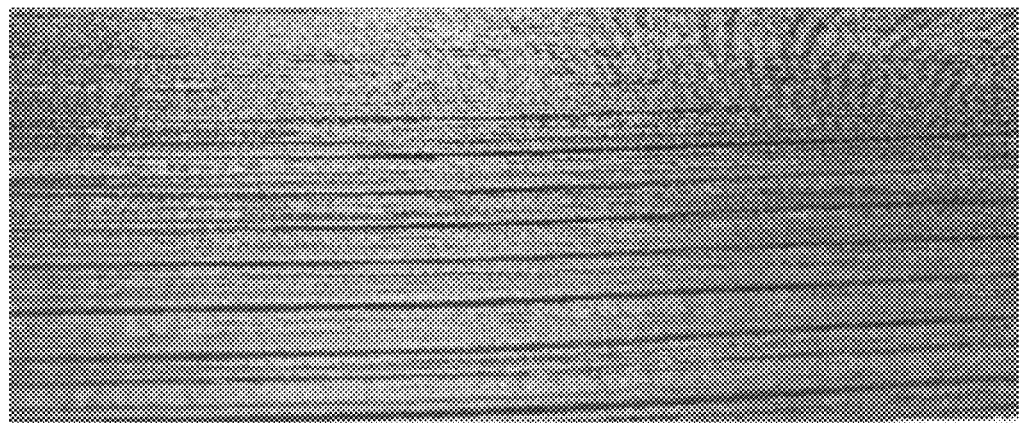
FIGS. 8A and 8B are schematic diagrams showing an image of a wood floor and an image captured therefrom by the optical detecting circuit according to one embodiment of the present disclosure.
Figure 8B:
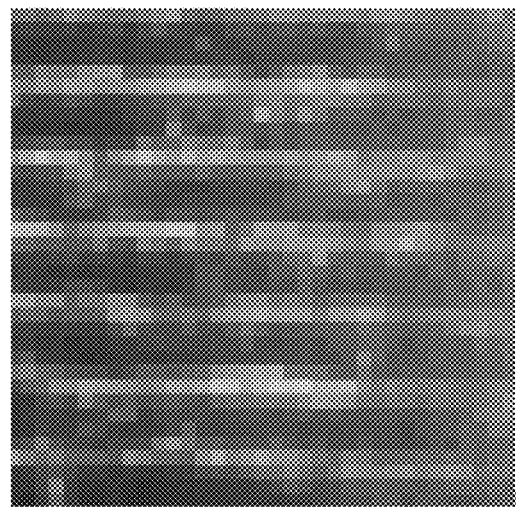

FIGS. 8A and 8B are schematic diagrams showing an image of a wood floor and an image captured therefrom by the optical detecting circuit according to one embodiment of the present disclosure.

Referring to FIGS. 8A and 8B, the wood floors are known to have surfaces with wood textures, thus the dark-filed illumination provided on such the floor FL may generate more scatter lights than those scattered from the floor with ceramic tiles. After the reflective lights enter the optical detecting circuit 40, a bright image with the wood textures is captured as shown in FIG. 8B. Thus, the overall light intensity summed from the wood floor may be larger than the first threshold, which is the same as a result obtained from the carpet. In this case, the floor type may be falsely detected due to the optical conditions of the wood floor and the carpet are similar, and a determination mechanism should be further provided for the floor type detection process.

Therefore, when it is determined that the optical characteristic of the floor in the target area meets the first surface condition in step S503, for example, the overall light intensity is greater than or equals to the first threshold, the method can further proceed to step S505: controlling the bright-field light source to provide bright-field illumination on the floor in the target area.

In step S505, the bright-field light source 42 is turned on by the processing circuit 46, while the dark-field light source 44 is turned off at the same time.

Next, the method proceeds to step S506: receiving, by the optical detecting circuit, scattered lights of the bright-field light source from the floor in the target area.

Step S507: executing a bright-field computation process to obtain a second optical characteristic of the target area according to the scattered lights of the bright-field light source received.

In step S507, an optical profile of the floor in the target area can be obtained in the bright-field computations process according to light intensities of the scattered lights of the bright-field light source 42 received by the optical detecting circuit 40.

For example, when the bright-field light source 42 is turned on and provides the bright-field illumination on the floor FL in the target area TA, the linear light source having the line pattern is reflected by the floor FL, such that the optical detecting circuit 40 can obtain an image by capturing the scattered lights of the bright-field light source 42, and a light pattern corresponding to the line pattern may appear in the obtained image.

Next, an optical profile can be obtained by processing the obtained image. Specifically, each column of pixels in the obtained image is processed to determine a location of a center of gravity of the light pattern in each column of the pixels, and the locations of the centers of gravity are taken as the optical profile of the floor FL in the target area TA.

Figure 9A:
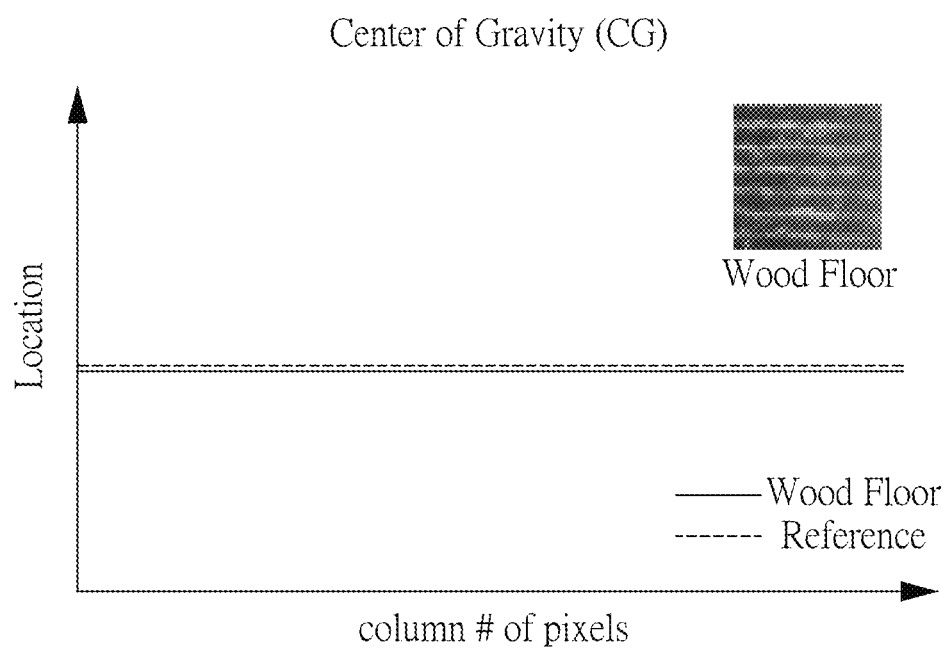
FIGS. 9A and 9B are schematic diagrams showing centers of gravity respectively obtained from a wood floor and a carpet by processing images captured by the optical detecting circuit according to one embodiment of the present disclosure.
Figure 9B:
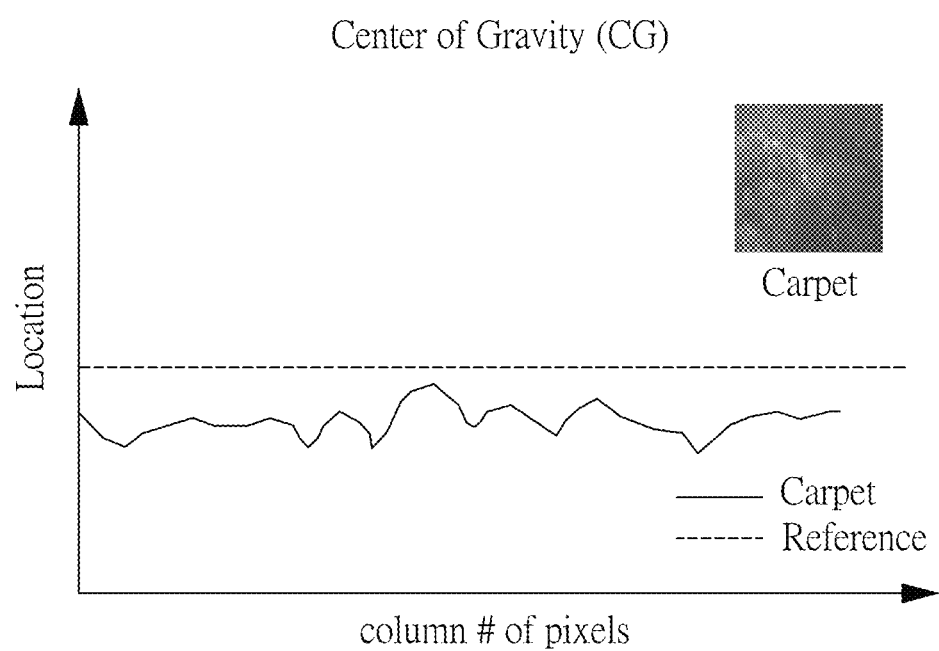

FIGS. 9A and 9B are schematic diagrams showing centers of gravity respectively obtained from a wood floor and a carpet by processing images captured by the optical detecting circuit according to one embodiment of the present disclosure.

Referring to FIGS. 9A and 9B, the linear light source is conventionally used to measure a distance between a sensor and an object according to locations of the centers of gravity of the captured light pattern. In the present disclosure, the linear light source is specifically used to measure a surface condition of the floor FL in the target area TA. As can be seen from FIG. 9A, since the wood floor is relatively flat, the locations of the centers of gravity obtained from the line pattern can be uniform. Differently, in FIG. 9B, since the carpet is rough and hairy, locations of the centers of gravity obtained from the line pattern varies and lacks smoothness or regularity.

Step S508: determining whether or not the second optical characteristic meets a second surface condition.

At step S508, the optical profile obtained in step S507 can be compared with a reference optical profile. The reference optical profile can be established in advance, by experimentally providing the bright-field illumination on various types of hard floors and obtaining and statistically collecting locations of centers of gravity. Therefore, a difference between the optical profile of the floor FL in the target area TA and the reference optical profile can be obtained and used to determine the floor type. For example, a location difference between the location of the center of gravity of each column of pixels of the optical profile and the location of the center of gravity of each column of pixels of the reference optical profile can be obtained, and an average of multiple ones of location difference can be taken as the difference in step S508.

Afterward, whether or not the difference exceeds a second threshold is determined. The second threshold can be established in advance, for example, by experimentally testing various types of hard floors and carpets and obtaining optical profiles thereof.

In response to determining that the second optical characteristic meets the second surface condition in step S508, for example, it is determined that the difference exceeds the second threshold as shown in FIG. 9B, the method proceeds to step S509: determining that the floor type of the floor in the target area is a second type, for example, the carpet.

In response to determining that the second optical characteristic does not meet the second surface condition in step S508, for example, it is determined that the difference does not exceed the second threshold as shown in FIG. 9A, the method proceeds to step S510: determining that the floor type of the floor in the target area is the first type, i.e., the hard floor such as the wood floor. It should be noted that the first type includes various types of hard floors, and the second type includes a carpet or any other fabric material used for covering floors.

In this way, the floor type can be accurately detected without affecting by fact that the optical conditions of the wood floor and the carpet are similar. In such the determination mechanism, the optical sensing system 4 will not be confused when the autonomous robot crossing a boundary between different types of floor or confronting small-sized obstacles since a region to be detected (i.e., the floor FL of the target area TA) is beneath the cleaner housing 1.

Beneficial Effects of the Embodiments

In conclusion, in the optical sensing system and the optical sensing method provided by the present disclosure, most types of flat and smooth hard floors can be determined by utilizing the dark-field illumination and mathematical operations with low complexities, and high report rate and low power consumption can be achieved.

Furthermore, for certain types of floors, the floor type can be accurately detected by using the bright-field illumination and optical profile processing without affecting by fact that the optical conditions of different types of floors are similar, and the optical sensing system and the optical sensing method provided by the present disclosure will not be confused when the autonomous robot crossing a boundary between different types of floor or confronting small-sized obstacles.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical sensing system, comprising:
    a bright-field light source;
    a dark-field light source;
    an optical detecting circuit; and
    a processing circuit configured to perform a floor type detection process, including:
        controlling the dark-field light source to provide dark-field illumination on a floor in the target area;
        receiving, by the optical detecting circuit, scattered lights of the dark-field light source from the floor in the target area;
        executing a dark-field computation process to obtain a first optical characteristic of the target area according to the scattered lights of the dark-field light source received, and determining whether or not the first optical characteristic meets a first surface condition;
        in response to determining that the optical characteristic of the floor in the target area does not meet the first surface condition, determining that a floor type of the floor in the target area is a first type;
        in response to determining that the optical characteristic of the floor in the target area meets the first surface condition, controlling the bright-field light source to provide bright-field illumination on the floor in the target area;
        receiving, by the optical detecting circuit, scattered lights of the bright-field light source from the floor in the target area;
        executing a bright-field computation process to obtain a second optical characteristic of the target area according to the scattered lights of the bright-field light source received, and determining whether or not the second optical characteristic meets a second surface condition; and
        in response to determining that the second optical characteristic meets a second surface condition, determining that the floor type of the floor in the target area is a second type.

2. The optical sensing system according to claim 1, wherein the dark-field light source and the bright-field light source are located in a dark field and a bright field, respectively, and the dark field and the bright field are defined by a field of view of the optical detecting circuit and located beneath a cleaner housing.

3. The optical sensing system according to claim 1, wherein the dark-field computation process includes:
    obtaining light intensities of the scattered lights of the dark-field light source received by the optical detecting circuit; and
    summing the light intensities obtained from the target area to obtain an overall intensity.

4. The optical sensing system according to claim 3, wherein the overall intensity of the target area is taken as the first optical characteristic, and the step of determining whether or not the first optical characteristic meets the first surface condition includes:
    determining whether or not the overall intensity is greater than or equal to a first threshold;
    in response to determining that the overall intensity is greater than or equal to the first threshold, determining that the first optical characteristic meets the first surface condition; and
    in response to determining that the overall intensity is not greater than or equal to the first threshold, determining that the first optical characteristic does not meet the first surface condition.

5. The optical sensing system according to claim 1, wherein the bright-field light source includes a linear light source.

6. The optical sensing system according to claim 5, wherein the bright-field computation process includes:
    obtaining an optical profile of the floor in the target area according to light intensities of the scattered lights of the bright-field light source received by the optical detecting circuit.

7. The optical sensing system according to claim 6, wherein the optical profile of the floor in the target area is taken as the second optical characteristic, and the step of determining whether or not the second optical characteristic meets the second surface condition includes:
    obtaining a difference between the optical profile of the target area and a reference optical profile; and
    determining whether or not the difference exceeds a second threshold;
    in response to determining that the difference exceeds the second threshold, determining that the second optical characteristic meets the second surface condition; and in response to determining that the difference does not exceed the second threshold, determining that the second optical characteristic does not meet the second surface condition.

8. The optical sensing system according to claim 7, wherein the floor type detection process further includes:
in response to determining that the second optical characteristic does not meet the second surface condition, determining that the floor type is the first type.

9. The optical sensing system according to claim 1, wherein the first type includes hard floors, the second type includes a carpet.

10. An optical sensing method, comprising:
configuring a processing circuit to perform a floor type detection process, including:
controlling a dark-field light source to provide dark-field illumination on a floor in the target area;
receiving, by an optical detecting circuit, scattered lights of the dark-field light source from the floor in the target area;
executing a dark-field computation process to obtain a first optical characteristic of the target area according to the scattered lights of the dark-field light source received, and determining whether or not the first optical characteristic meets a first surface condition;
in response to determining that the optical characteristic of the floor in the target area does not meet the first surface condition, determining that a floor type of the floor in the target area is a first type;
in response to determining that the optical characteristic of the floor in the target area meets the first surface condition, controlling a bright-field light source to provide bright-field illumination on the floor in the target area;
receiving, by the optical detecting circuit, scattered lights of the bright-field light source from the floor in the target area;
executing a bright-field computation process to obtain a second optical characteristic of the target area according to the scattered lights of the bright-field light source received, and determining whether or not the second optical characteristic meets a second surface condition; and
in response to determining that the second optical characteristic meets a second surface condition, determining that the floor type of the floor in the target area is a second type.

11. The optical sensing system according to claim 10, wherein the dark-field light source and the bright-field light source are located in a dark field and a bright field, respectively, and the dark field and the bright field are defined by a field of view of the optical detecting circuit and located beneath a cleaner housing.

12. The optical sensing method according to claim 10, wherein the dark-field computation process includes:
obtaining light intensities of the scattered lights of the dark-field light source; and
summing the light intensities of the scattered lights of the dark-field light source to obtain an overall intensity.

13. The optical sensing method according to claim 12, wherein the overall intensity of the target area is taken as the first optical characteristic, and the step of determining whether or not the first optical characteristic meets the first surface condition includes:
determining whether or not the overall intensity is greater than or equal to a first threshold;
in response to determining that the overall intensity is greater than or equal to the first threshold, determining that the first optical characteristic meets the first surface condition; and
in response to determining that the overall intensity is not greater than or equal to the first threshold, determining that the first optical characteristic does not meet the first surface condition.

14. The optical sensing method according to claim 10, wherein the bright-field light source includes a linear light source.

15. The optical sensing method according to claim 13, wherein the bright-field computation process includes:
obtaining an optical profile of the floor in the target area according to light intensities of the scattered lights of the bright-field light source received.

16. The optical sensing method according to claim 15, wherein the optical profile of the floor in the target area is taken as the second optical characteristic, and the step of determining whether or not the second optical characteristic meets the second surface condition includes:
obtaining a difference between the optical profile of the target area and a reference optical profile; and
determining whether or not the difference exceeds a second threshold;
in response to determining that the difference exceeds the second threshold, determining that the second optical characteristic meets the second surface condition; and
in response to determining that the difference does not exceed the second threshold, determining that the second optical characteristic does not meet the second surface condition.

17. The optical sensing method according to claim 16, wherein the floor type detection process further includes:
in response to determining that the second optical characteristic does not meet the second surface condition, determining that the floor type is the first type.

18. The optical sensing method according to claim 10, wherein the first type includes hard floors, the second type includes a carpet.

* * * * *